United States Patent
Gomes De Lima

(10) Patent No.: US 7,242,119 B2
(45) Date of Patent: Jul. 10, 2007

(54) ELECTRICAL MACHINE HAVING A STATOR WITH COOLED WINDING BARS

(75) Inventor: Paulo Gomes De Lima, Wettingen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/081,964

(22) Filed: Mar. 17, 2005

(65) Prior Publication Data

US 2005/0200212 A1    Sep. 15, 2005

Related U.S. Application Data

(63) Continuation of application No. PCT/CH03/00540, filed on Aug. 11, 2003.

(30) Foreign Application Priority Data

Sep. 23, 2002   (DE)   ................ 102 44 202

(51) Int. Cl.
   *H02K 9/00*   (2006.01)
(52) U.S. Cl. ........................................... 310/52
(58) Field of Classification Search ............... 310/52, 310/58, 59, 65, 216
   See application file for complete search history.

(56) References Cited

U.S. PATENT DOCUMENTS 2,695,368 A * 11/1954 Kilbourne ............... 310/64
4,028,569 A * 6/1977 Towne ..................... 310/64
5,602,435 A * 2/1997 Iseli et al. ................ 310/55
6,121,708 A * 9/2000 Muller ...................... 310/214
6,268,668 B1 * 7/2001 Jarczynski et al. ......... 310/52
6,856,053 B2 * 2/2005 LeFlem et al. ............. 310/54

FOREIGN PATENT DOCUMENTS

| DE | 196 21 058 A1 | 11/1997 |
| EP | 0 172 397 B1 | 2/1986 |
| EP | 0 684 682 A1 | 11/1995 |
| JP | 08116638 A * | 5/1996 |

* cited by examiner

*Primary Examiner*—Thanh Lam
(74) *Attorney, Agent, or Firm*—Buchanan Ingersoll & Rooney PC

(57) ABSTRACT

An electrical machine comprises a stator (10) with a laminated core (11) in which two or more slots (12) are provided which run in the axial direction and in each of which two or more winding bars (13, 14) are arranged one above the other in the radial direction and are separated from one another by spacers (19) between them, and in which channels (20) which run parallel to the winding bars (13, 14) are provided, through which a cooling medium flows, in order to cool the winding bars (13, 14) and, considerably better cooling of the winding is achieved with little complexity in that tubular facing elements (19), which extend in the axial direction and whose interior in each case forms a channel (20) for the cooling medium are used as spacers.

5 Claims, 3 Drawing Sheets

ELECTRICAL MACHINE HAVING A STATOR WITH COOLED WINDING BARS

This application claims priorities under 35 U.S.C. §119 to German Application No. 102 44 202.9 filed Sep. 23, 2002, and as a Continuation Application Under 35 U.S.C. §120 to PCT Application No. PCT/CH03/00540 filed as an International Application on Aug. 11, 2003 designating the U.S., the entire contents of which are hereby incorporated by reference in their entireties.

TECHNICAL FIELD

The present invention relates to the field of cooling of electrical machines. It relates in particular to an electrical machine as claimed in the precharacterizing clause of claim 1.

A machine such as this is known, for example, from the document EP-B1-0 172 397.

PRIOR ART

Large rotating electrical machines such as generators for production of electrical power have a rotor and a stator which concentrically surrounds the rotor. This stator is normally in the form of a laminated core, formed from individual laminates. For high powers, the stator winding that is accommodated in the stator is formed from individual winding bars which are inserted into corresponding slots in the laminated core of the stator and are secured in the slots by means of slot closure wedges.

A detail of a cross section through a slot of a stator that is filled with winding bars, from the prior art, is illustrated in FIG. 1. The stator 10' in FIG. 1, whose lower, transversely running boundary, at the same time bounds the air gap to the rotor which is located underneath but is not illustrated in FIG. 1 has, in the laminated core 11, a slot 12 which extends outwards from the air gap in the radial direction and in which two winding bars 14 and 13 are arranged one above the other in the radial direction. The winding bars 13, 14 themselves have a complicated internal design, which is indicated in FIG. 1 but will not be described in any more detail here.

A slot intermediate layer 17 is provided between the two winding bars 13, 14 and is used to improve the electrical and mechanical characteristics of the winding. The winding bars 13, 14 are secured in the slot 12 in a manner known per se by means of a wedge 15. A wedge support 16 is generally also provided between the wedge 15 and the upper winding bar 14.

During operation of the machine, considerable electrical power losses are produced in the windings, which result in heat which must be dissipated to the exterior from the windings. For cooling purposes, a cooling medium, generally air or some other gas normally flows through specific radial cooling slots in the laminated stator core, and also in the axial direction through the air gap or axial channels which run between the slots in the laminated core. However, one problem is always that the heat that is produced in the winding bars must be transported out of the winding slots through the laminated core into the closest cooling channels.

One possible way to improve the cooling of the winding bars is to design the winding bars to be partially hollow so that they themselves form cooling channels (for example see, DE-A1-196 21 058). However, this reduces the conductor cross section. Furthermore, it is complex to include the hollow winding bars in a corresponding cooling circuit.

Another possibility is to provide channel-like recesses at the sides on the winding slots, through which the cooling medium can flow at the side along the winding bars, and in direct contact with them (in this context, see EP-A1-0 684 682). A comparable solution is described in the initially cited EP-B1-0 172 397, in which cooling channels are likewise formed in the slots on the sides of the winding bars.

These known solutions have the disadvantage of the comparatively high degree of complexity for the specific configuration of the winding slots, and the means which must additionally be installed for guiding the flow of the cooling medium, and these considerably lengthen the assembly process for the machine.

DESCRIPTION OF THE INVENTION

The object of the invention is thus to provide an electrical machine having a cooled stator winding which avoids the disadvantages of known machines and is distinguished, in particular, by considerably better cooling of the winding bars while at the same time reducing the assembly effort and improving the thermomechanical characteristics.

The object is achieved by the totality of the features of claim 1. The essence of the invention is that the conventional spacers, which are composed of solid material, between the winding bars are replaced by tubular spacing elements which extend in the axial direction and whose interior in each case forms a channel for the cooling medium. In consequence, a highly efficient cooling channel can be created directly between the winding bars in a very simple manner with virtually no change to the slot and without any additional space requirement, effectively dissipating the heat losses from the winding bars.

As an additional advantage, absorption of vibration and expansion in the winding bars can be achieved if the tubular spacing elements are sprung in the radial direction. This can be achieved in particular by the spacing elements having a lenticular cross section.

The cooling spacing elements can be integrated in the cooling circuit of the machine particularly easily by arranging cooling slots, through which the cooling medium flows, at regular intervals running in the radial direction in the laminated core of the stator, transversely with respect to the winding bars, and by the spacing elements each having openings in the area of the cooling slots, through which openings cooling medium can flow out of the interior of the spacing elements into the cooling slots and from the cooling slots into the interior of the spacing elements.

The coupling is particular good when means are provided in the cooling slots to guide the flow of the cooling medium out of the cooling slots into the openings in the spacing elements. Spacekeepers are preferably used as flow guiding means and are arranged in the cooling slots.

BRIEF EXPLANATION OF THE FIGURES

The invention will be explained in more detail in the following text using exemplary embodiments and in conjunction with the drawing in which.

APPROACHES TO IMPLEMENTATION OF THE INVENTION

Figure 1:
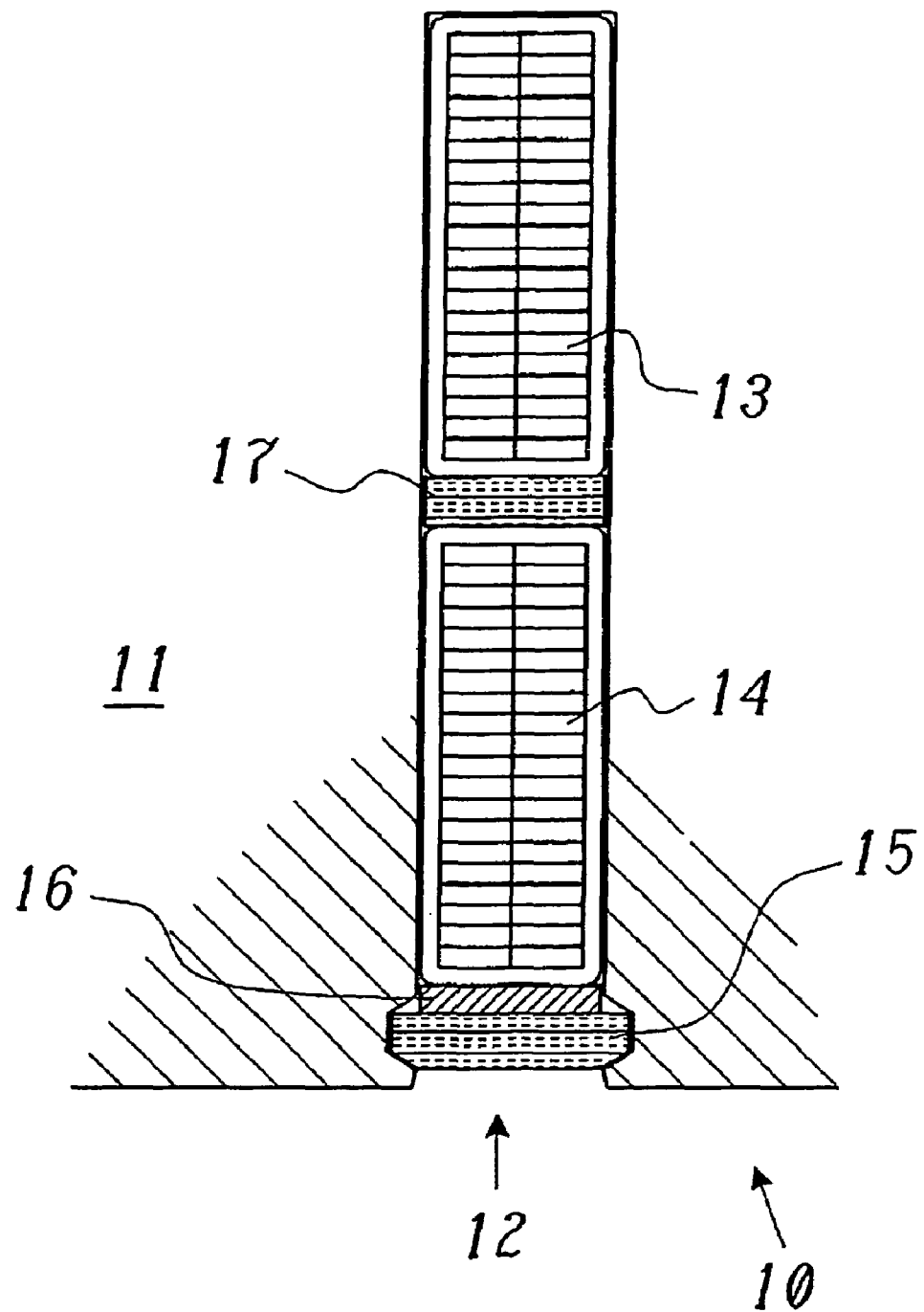
FIG. 1 shows a cross section of a slot, filled with winding bars, in a laminated stator core according to the prior art.
Figure 2:
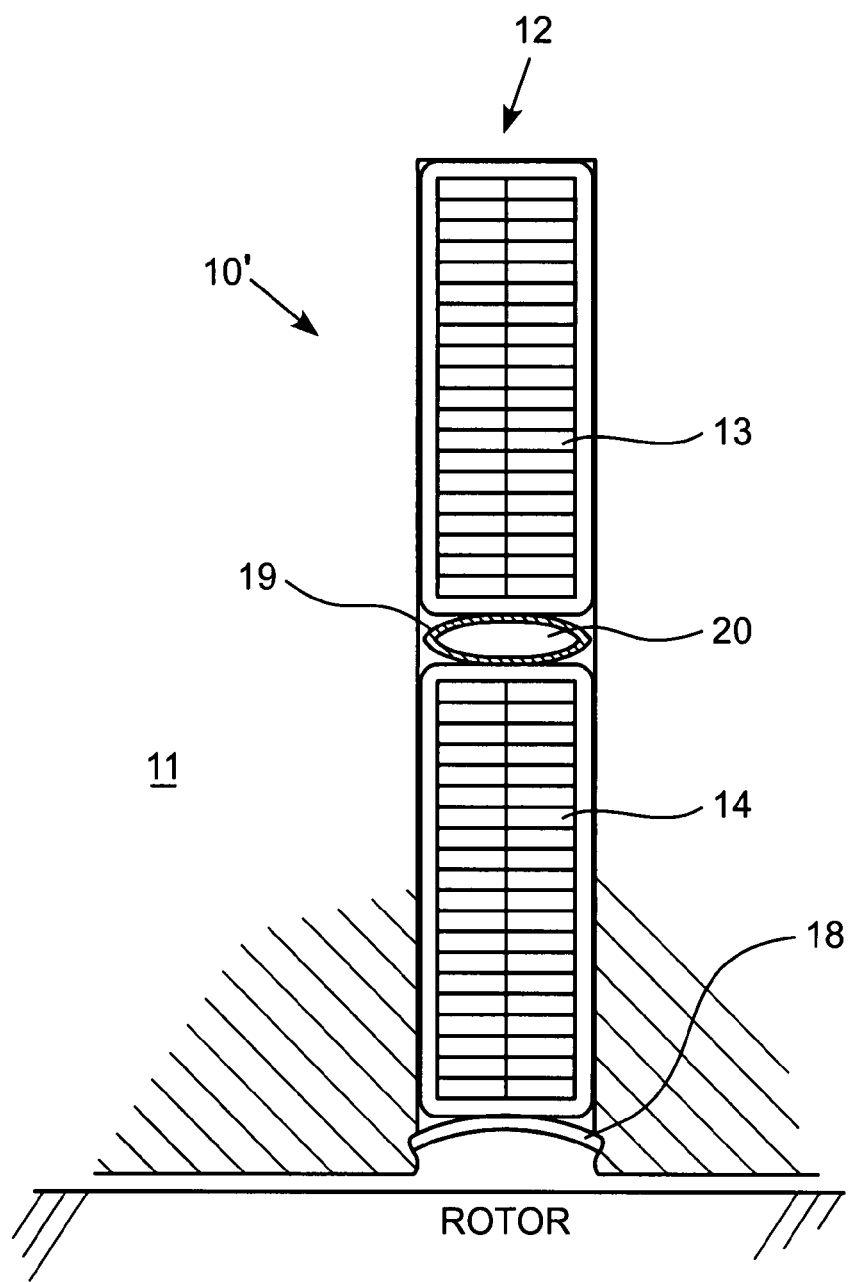
FIG. 2 shows an illustration, comparable to that in FIG. 1, of one preferred exemplary embodiment of the invention.

FIG. 2 uses an illustration comparable to that in FIG. 1 to show one preferred exemplary embodiment of the invention. In its laminated core, the stator 10 has two or more slots 12 which run in the radial direction for holding winding bars 13, 14 (which run in the axial direction). The winding bars 13, 14 which are arranged one above the other in the slot 12 are fixed in the slot 12 by means of a (sprung) wedge 18. Instead of the conventional slot intermediate layer composed of solid material, a hollow spacing element 19 with a lenticular cross section is now arranged between the winding rods 13, 14. The hollow interior of the spacing element 19 forms a channel 20 through which cooling medium can flow between the winding bars 13, 14 and highly efficiently absorb heat from the winding bars 13, 14. The lenticular cross section of the spacing element 19 has two advantages: firstly, if a suitable material is chosen for the spacing element 19, this results in a spring effect which prestresses the winding bars in the radial direction. This makes it possible to absorb and neutralize vibration in the winding bars 13, 14 as well as thermal expansion or the like, thus considerably improving the operational reliability. On the other hand, the flat faces of the "lens" rest with a larger area on the adjacent winding bars, thus considerably improving the heat transfer between the winding bars 13, 14 and the spacing element.

Figure 3:
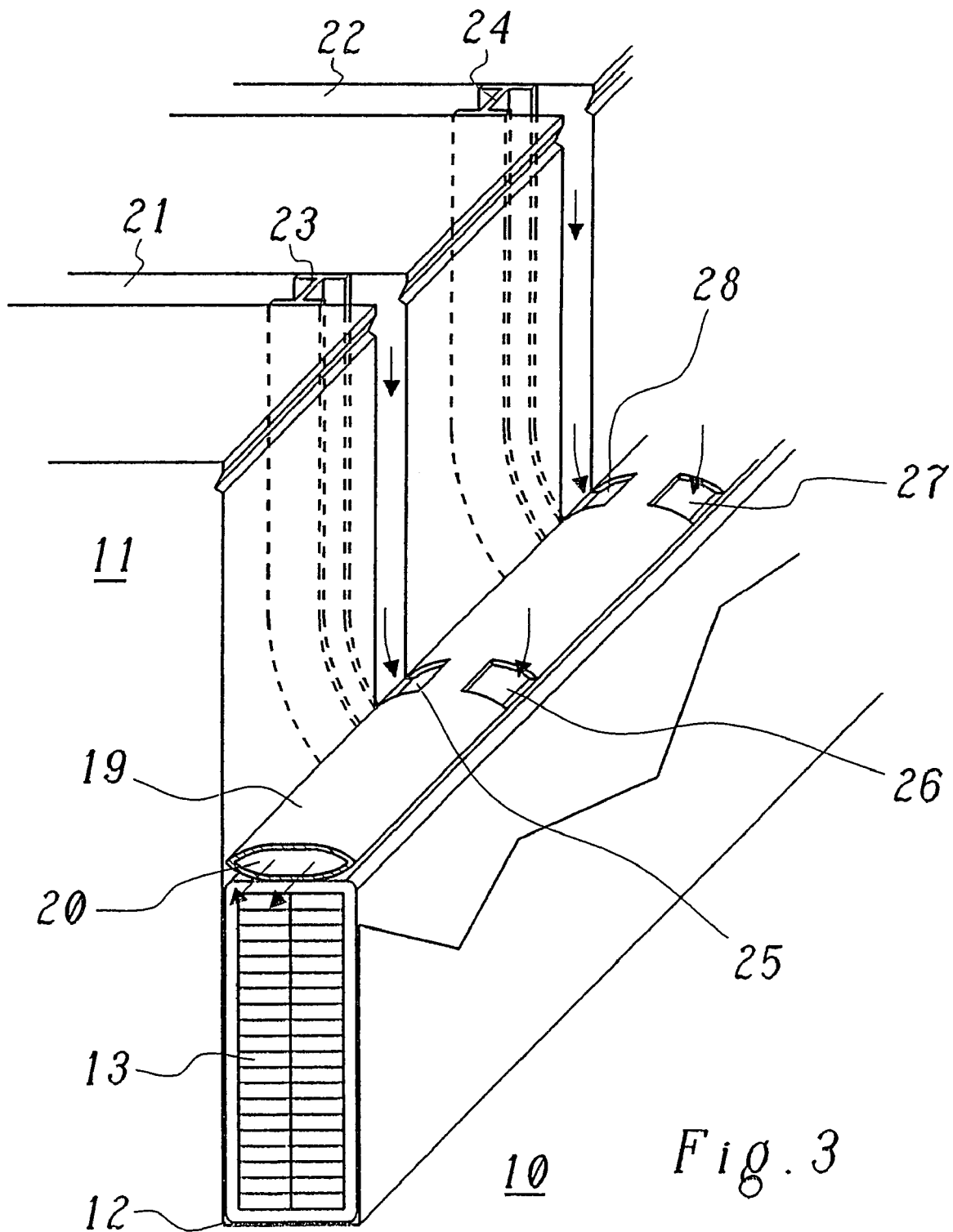
FIG. 3 shows a perspective, partially cutaway side view of one preferred type of coupling between the spacing element according to the invention and the (existing) radial cooling slots in the stator.

The channel 20 of the spacing element 19 is now advantageously included in a simple manner, as shown in FIG. 3, in the existing cooling circuit of the stator 10 by providing appropriate openings 25, . . . , 28 in the spacing elements 19 at those points at which the (radial) cooling slots 21, 22 in the laminate core 11 of the stator cross the slots 12, through which openings 25, . . . , 28 the channel 20 in the spacing element 19 can exchange cooling medium in one direction or the other with the cooling slots 21, 22.

The arrows in FIG. 3 show one flow direction, in which cooling medium flows out of the cooling slots 21, 23 through the openings 25, . . . , 28 into the channel 20, and flows out of the cooling channel 20 again the axial direction. This flow is reinforced by the spacekeepers 23, 24, which are provided in the cooling slots 21, 22 to provide mechanical robustness for the cooling slots 21, 22, being curved towards the openings 25, . . . , 28 so as to guide the flow. The opposite flow direction is likewise provided. The flow direction which occurs in any given case is governed by the overall flow plan for the machine and for the stator.

Overall, the invention results in an electrical machine with cooled stator winding which is distinguished by the following advantages:

The heat transfer coefficient from the winding bars is improved

The assembly time is reduced owing to the lack of the slot intermediate layer

The amount of stamped material is reduced

Vibration and expansion of the winding bars can be absorbed by means of a spring effect.

LIST OF REFERENCE SYMBOLS

| | |
|---|---|
| 10, 10' | Stator |
| 11 | Laminated core |
| 12 | Slot |
| 13, 14 | Winding bar |
| 15 | Wedge |
| 16 | Wedge support |
| 17 | Slot intermediate layer |
| 18 | Wedge |
| 19 | Spacing element (tubular) |
| 20 | Channel |
| 21, 22 | Cooling slot |
| 23, 24 | Spacekeeper |
| 25, . . . , 28 | Opening |

The invention claimed is:

1. An electrical machine, comprising
a rotor being rotatable about a machine axis;
a stator concentrically surrounding said rotor, said stator comprising a laminated core in which a plurality of radial slots are provided which run in the axial direction and in each of which two or more winding bars are arranged one above the other in the radial direction; wherein
said stator is cooled by a cooling medium flowing through the interior of said stator;
said winding bars are separated from one another in said radial direction by spacers arranged between them; and
said spacers each have the form of a tube, which extends in the axial direction and whose interior in each case forms a channel for said cooling medium flowing through said stator, wherein said spacers are sprung in the radial direction thereby providing absorption of vibration and allowing expansion of said winding bars.

2. The electrical machine as claimed in claim 1, wherein said spacers have a lenticular cross section.

3. The electrical machine as claimed in claim 1, wherein cooling slots through which the cooling medium flows are arranged in the laminated core of the stator at regular intervals along said machine axis;
said cooling slots cross said radial slots for said winding barn in a direction perpendicular to said machine axis; and
spacers each have openings in the area of said cooling slots through which cooling medium can flow from the interior of said spacers into said cooling slots and from said cooling slots into the interior of said spacers.

4. The electrical machine as claimed in claim 3, wherein means are provided in said cooling slots to guide the flow of the cooling medium from said cooling slots into said openings in said spacers.

5. The electrical machine as claimed in claim 4, wherein spacekeepers are arranged in said cooling slots; and said space keepers are used as said flow guiding means.

* * * * *